United States Patent [19]

Miller et al.

[11] Patent Number: 4,590,084

[45] Date of Patent: May 20, 1986

[54] RETORTED PASTE PRODUCTS CONTAINING HIGH AMYLOSE STARCH

[75] Inventors: Birgit J. Miller, Plainsboro; Harvey Bell, Martinsville; Eugene Wojcak, Manville, all of N.J.

[73] Assignee: National Starch and Chemical Corporation, Bridgewater, N.J.

[21] Appl. No.: 578,166

[22] Filed: Feb. 8, 1984

[51] Int. Cl.[4] .............................................. A21L 1/16
[52] U.S. Cl. ..................................... 426/557; 426/131
[58] Field of Search ............... 426/557, 451, 407, 131, 426/399, 402, 324, 5

[56] References Cited

U.S. PATENT DOCUMENTS

| | | | |
|---|---|---|---|
| 1,716,966 | 6/1929 | DiLeonardo | 426/451 |
| 3,904,601 | 9/1975 | Tessler et al. | 260/233.3 |
| 3,970,767 | 7/1976 | Tessler et al. | 426/579 |
| 4,466,985 | 8/1984 | Tsen et al. | 426/557 |

FOREIGN PATENT DOCUMENTS

50-39129 12/1975 Japan .................................. 426/557

OTHER PUBLICATIONS

"Effect of Starch on Pasta Dough Rheology and Spaghetti Cooking Quality", J. E. Dexter and R. R. Matsuo, *Cereal Chemistry*, vol. 56, No. 3 (1979), pp. 190–195.

*Primary Examiner*—Raymond N. Jones
*Assistant Examiner*—Elizabeth A. King
*Attorney, Agent, or Firm*—Edwin M. Szala; Lori D. Tolly

[57] ABSTRACT

Improved retortable farinaceous-based paste products are provided by the inclusion of an effective amount of a high amylose starch with an amylose content of at least 50% in the paste composition. Paste products including pasta and tortillas which contain the high amylose starch, typically in amounts of about 10 to 40%, are provided with improved cooking tolerance and firmness after retorting.

15 Claims, No Drawings

RETORTED PASTE PRODUCTS CONTAINING HIGH AMYLOSE STARCH

BACKGROUND OF THE INVENTION

This invention relates to improvements in the production of retortable alimentary paste products including such items as pasta (i.e. spaghetti and noodles), tortillas and the like which are heat processed. More particularly this invention relates to the preparation of paste products which require increased cooking tolerance and which provide food products with improved firmness after being cooked at super atmospheric pressure.

Consumers have varying opinions based on personal prejudices and traditions as to the desired qualities a paste product such as pasta should possess. It is generally accepted, however, that pasta should have the following characteristics: a yellow colour, smooth surface, and a resistance to cooking; and after cooking the pasta should be non-sticking and non-clumping with a good "bite", without being either too elastic or too soft.

The term "al dente" is used to describe a commonly desired texture and cook of pasta. Al dente can be defined as being slightly firm with a bite or slight resistance to chewing. Upon cooking pasta in boiling water, the texture of the product will change from firm (undercooked) to slightly firm with a good bite (al dente) to soft and tender and finally to mushy and sticky (overcooked).

In recent years as the use of prepared and processed foods has become more prevalent, a demand has risen for foods having properties specially adapted to the requirements of industrial processing. In general, food systems containing various farinaceous-based paste products are deleteriously affected when retorted. Such products exhibit over-cooked characteristics such as being soft and mushy with a poor mouthfeel in comparison to similar products which have been cooked by other means such as boiling or baking. For example, currently marketed canned enchiladas, which are corn tortillas stuffed with meat or various fillings, have a tendency to lose their shape and rip apart while being reheated in a saucepan by consumers. The retorted tortilla dough is not firm enough to remain intact upon reheating.

A study by Dexter et al. appearing in *Cereal Chemistry*, Vol. 56, No. 3 (1979), pps. 190–195 indicated that high amylose corn starch imparts a slight improvement in cooked spaghetti firmness. The study, however, also concluded that other starch properties may supersede amylose content in imparting cooking quality once a threshold level of amylose is obtained.

Accordingly, it is an object of the present invention to provide firm textured paste products with improved cooking tolerance to retort conditions.

It is another object to provide an improved process for preparing retortable paste products.

SUMMARY

The present invention provides an improved farinaceous based paste product wherein the improvement comprises the presence of an effective amount of high amylose starch or flour in the composition. The use of high amylose starch in amounts of about 10–40%, preferably 15–35%, based on the weight of the farinaceous material provides improved cooking tolerance and firmness to paste products which are to be retorted.

DESCRIPTION OF THE PREFERRED EMBODIMENTS

It is well known that starch is composed of two fractions, the molecular arrangement of one being linear and the other being branched. The linear fraction of starch is known as amylose and the branched fraction as amylopectin. Methods for separating starch into these two components are known. Starches from different sources, e.g. potato, corn, tapioca, and rice, etc., are characterized by different relative proportions of the amylose and amylopection components. Some plant species have been genetically developed which are characterized by a large preponderance of the one fraction over the other. For instance, certain varieties of corn which normally contain 22–28% amylose have been developed which yield starch composed of over 50% amylose. These hybrid varieties have been referred to as high amylose corn or amylomaize.

High amylose corn hybrids were developed in order to naturally provide starches of high amylose content and have been available commercially since about 1963. We have now found that the high amylose starch and flour of these hybrids, when added to paste compositions, surprisingly provide improved properties to foodstuffs in terms of cooking tolerance and firmness when cooked under retort conditions.

Suitable high amylose starches useful herein are those starches with an amylose content of at least 50%. Although high amylose corn starch and flour have been found to be especially suitable herein, this invention also encompasses high amylose starches and flours derived from sources other than corn which contain concentrations of at least 50% amylose based on total starch content with similar results expected. Suitable starches would include those starches produced from any high amylose plant species of, for example, wheat, rice, rye, potato, oats, barley, pea, and millet.

It is to be understood that the invention herein is meant to include not only paste products containing high amylose starch or flour but also those compositions containing any ground products from the high amylose plant such as, for example, grits, hominy, and meal.

While the use of natural unconverted and unmodified high amylose starch is preferred for the intended use herein, it is to be understood that starch which has been lightly converted or modified by typical processes known in the art (i.e., etherification, esterification, and crosslinking) may be employed in the paste composition provided the modification does not deleteriously affect the retorted paste product. Dextrinized and pregelatinized high amylose starches, however, are not recommended for use herein. It has been found that the dextrinized flour provides pasta with a brown color as well as an undesirable bitter off-taste. Pregelatinized high amylose starch was found to provide pasta with a poorer cooking tolerance.

In preparing the novel paste products, any suitable farinaceous starch containing material may be employed in addition to the high amylose starch. Such materials applicable in the process include semolina, durum flour, farina, masa, all purpose wheat flour as well as other flours and starches derived from such sources as corn, sago, wheat, rice, potato, sweet potato, waxy maize, tapioca, sorghum, or waxy sorghum starch.

The amount of high amylose starch employed in the paste composition is normally in the range of 10 to 40% based on the total weight of farinaceous material, preferably in the range of 15 to 35%. The optimum amount of high amylose starch required will vary depending on the paste product produced, the ingredients normally employed therein, and the overall farinaceous constitution of the paste product.

Other materials can be added to the composition if so desired. For instance, it if is desired to make egg noodles, dry or liquid eggs (yolks, whites, or both) may be employed. If it is desired to increase the nutritional value of the food, high protein substances such as milk proteins or fish protein concentrate may be added. Vitamins, minerals, and other enriching agents such as thiamine, calcium and amino acids as well as disodium phosphate, seasonings, gum gluten, and glyceryl monostearate may also be employed.

In the preparation of pasta, for example, the practitioner initially dry blends together all the ingredients until they are uniformly dispersed. Water is then added to the dry blend with continued mixing until a dough is obtained which is plastic enough to be sheeted or extruded but firm enough to cohere. The paste formulation will normally contain about 75 parts of dry farinaceous material and about 25 parts of water. These proportions will vary depending on such factors as the variety of flour employed, gluten quality, protein content, initial flour moisture and flour particle size.

The pasta may be shaped in one of many conventional ways known in the art and then dried by any equally conventional drying technique as long as the starch component is left in essentially ungelatinized form.

In order to employ the pasta described herein in retort systems, the pasta will normally be parboiled for about 5 minutes, allowing the pasta to partially hydrate. The pasta is then immediately drained and rinsed in cold water in order to cease further cooking prior to retorting. The pasta may be mixed with any suitable ingredients and/or sauce desired by the practitioner prior to retort processing.

Various food systems which may benefit by the inclusion of pasta possessing improved cooking tolerance and firmness after retorting would include canned pasta products such as spaghetti in sauce, ravioli, lasagna, macaroni and cheese, and macaroni salad; and pasta-containing soups. Additional food systems which would benefit from employing pasta possessing improved cooking tolerance would include institutional foods such as macaroni and cheese which are often served after being subjected to steam heating for long periods of time.

It should be appreciated that high amylose starch employed in other paste products which are to be retorted will also provide improvements in the cooking quality of such products. Such food systems include, for example, enchiladas and tamales. Tortillas, commonly prepared from masa, a corn flour obtained from alkali-treated kernals, are used in the preparation of enchiladas. The dry ingredients are moistened with enough water (usually in a 1:1 ratio) to form a dough which is then rolled or pressed into sheets and cut to a desired shape. The tortillas are filled with meat, cheese, and/or vegetable fillings, rolled, and then optionally wrapped in parchment paper prior to retorting in a sauce. It was discovered that by adding high amylose corn flour or starch in concentrations above about 10%, based on the dry ingredients, to the tortilla formulation, retorted enchiladas or tamales with improved firmness and resistance to tearing upon reheating resulted.

The following examples will more fully illustrate the practice of this invention but they are not intended to limit its scope. In the examples, all parts and percentages are given by weight and all temperatures are in degrees Celsius unless otherwise noted. The following procedures were employed in order to prepare and evaluate pasta samples:

PASTA PREPARATION

The flours and starches were first dry blended with a wire whip for five minutes in a Hobart Mixer in order to obtain a uniform blend. Employing a dough hook, water was added slowly to the dry ingredients and mixed on low speed for 10 minutes thereby hydrating the starch and protein and producing crumb-like masses. The dough "crumbs" were sheeted employing a double drum apparatus for about 5 minutes in order to work the gluten. The sheeted dough was thereafter cut into non-tubular cord shapes measuring 1 mm thick and 5-6 mm in diameter with a pasta machine. The shaped pasta was air dried for 24 hours to a final moisture of less then about 13%.

BOILING WATER COOKING QUALITY TEST

The following test was carried out in order to determine the resistance to cooking of each pasta sample.

A total of 40 grams of dried pasta was cooked in boiling salted water (0.5 grams of salt in 4 cups of water). Samples were removed every 5 minutes, drained, and evaluated organoleptically by a bite test. The cooking time was determined to be the number of minutes required to cook the pasta to an al dente texture. The cooking tolerance time was determined to be the total number of minutes of cooking before the pasta began to lose its integrity resulting in an unacceptable, soft-textured product.

PASTA RETORT PROCEDURE

A total of 40 grams of dried pasta was parboiled for 5 minutes in boiling salted water, drained, and rinsed in cold water. A portion of the parboiled pasta (40 grams) was transferred to a tin can measuring 6.7 cm in diameter and 10.0 cm high. A total of 1½ cups of meatless spaghetti sauce (pH 3.5–4.2) heated to a temperature of 82°–85° C. (180°–185° F.) was added and mixed with the pasta leaving ¼ inch headspace at the top of the can. The can was sealed and then heated in an agitating retort to a center can temperature of 113°–115° C. (235°–240° F.). It took approximately 30 minutes to reach such a temperature and then an additional 10 minutes of cooling before the can, having a center can temperature of 93° C. (200° F.) could be removed.

EXAMPLE 1

This example illustrates various pasta formulations prepared by partially substituting high amylose flour and starch for all purpose wheat flour or semolina.

Pasta samples were prepared employing 1125 grams of farinaceous material and 375 grams of water. The samples were evaluated by the boiling water cooking quality test. Additional samples were prepared and evaluated which contained regular corn flour or waxy maize flour (containing 0–1% amylose). Results may be found in Table I.

During the pasta sheeting process, it was noted that at substitution levels up to 30% of the various flours and starch, no problems were presented. At 40 and 50% substitution levels, sheeting became more difficult. The doughs (which employed the same amount of water) were drier than the controls and thus the dough strengths were reduced. A sample containing an acid converted dextrin of high amylose corn flour was extremely difficult to sheet at all substitution levels due to the wetness and stickiness of the dough.

TABLE I

BOILING WATER COOKING QUALITY TEST
PASTA COOKING TIME (COOKING TOLERANCE) MEASURED IN MINUTES.

| Flour Substitute | Ratio of All Purpose Wheat Flour:Flour Substitute | | | | | |
|---|---|---|---|---|---|---|
| | 100:0 | 90:10 | 80:20 | 70:30 | 60:40 | 50:50 |
| High Amylose Corn Starch (70% amylose) | 10 (25) | 15 (25) | 15 (25) | 15–20 (25) | 20 (25) | 20 (25) |
| High Amylose Corn Flour (50% amylose) | 10 (25) | 10–15 (25) | 20–25 (30) | 25–30 (35) | 30 (35–40) | 30–35 (40) |
| High Amylose Corn Flour (70% amylose) | 10 (25) | 15 (25) | 25–30 (40) | 30–35 (45–50) | 35 (40) | 35–40 (40–45) |
| High Amylose Corn Flour (70% amylose)[1] | 10 (25) | — | — | 30–35 (50) | 35 (50) | — |
| Modified High Amylose Flour[2] | 10 (25) | 15 (25) | — | 10 (20) | 15 (25) | — |
| Regular Corn Flour | 10 (25) | 10–15 (25) | 20 (25–30) | 20–25 (30) | 20 (30) | 20 (30) |
| Waxy Maize Flour | 10 (25) | 10 (25) | 5–10 (20) | 5–10 (15) | 5–10 (15) | 5–10 (10) |

[1]Semolina was used in place of all purpose wheat flour.
[2]Acid converted dextrin of high amylose corn flour (containing 70% amylose) which had been converted to a solubility of approximately 50% at a pH of 2.8.

As can be seen in Table I, conventional pasta containing either 100% all purpose wheat flour or semolina required approximately 10 minutes to cook to al dente texture. When corn flour or high amylose corn flour were substituted in amounts greater than 10% in the formulations, the cooking times and cooking tolerances were significantly increased, especially when high amylose flour (containing 70% amylose) was employed. It was noted, however, that at substitution levels of 40% or more, the texture as well as flavor of these samples was negatively affected. The samples had a slight firmness but the bite and chewiness was not acceptable. Also the samples possessed an apparent off-taste at these high substitution levels. High amylose corn starch was seen to increase the cooking time somewhat but not the boiling water cooking tolerance of the pasta.

Waxy maize flour produced pasta which cooked out faster than the controls and which had a lower cooking tolerance and quality. This result is consistent with that described by Dexter et al. discussed above. It can be seen that as the amount of amylose in a pasta sample is decreased, pasta with an inferior cooking quality is obtained.

The flour substitutes also provided pasta products which varied in appearance. It was noted that high amylose corn flour and regular corn flour produced products which were golden in color. Waxy maize flour produced an off-white product while high amylose starch produced a white product comparable to that provided by 100% all purpose wheat flour. The acid converted dextrinized high amylose flour provided pasta with a brown, off-colored appearance as well as a bitter-burnt taste.

EXAMPLE 2

This example illustrates the effect of high amylose corn starch and flour on the texture of retorted pasta.

Pasta samples were prepared and retorted as described above. The texture of the retorted pasta was evaluated at room temperature by the following rating scale:
1=firm
2=al dente
3=soft, tender
4=mushy
5=weak, poor bite
The results may be found in Table II.

TABLE II

TEXTURE RATING OF RETORTED PASTA

| Substitute | Ratio of All Purpose Wheat Flour:Flour Substitute | | | | | |
|---|---|---|---|---|---|---|
| | 100:0 | 90:10 | 80:20 | 70:30 | 60:40 | 50:50 |
| High Amylose Corn Starch (70% amylose) | 4 | 3.5 | 2.5 | 2 | 3* | 3.5* |
| High Amylose Corn Flour (50% amylose) | — | 3.5 | 2.5 | 2 | 2.5* | 3.5** |
| High Amylose Corn Flour (70% amylose) | — | 3.5 | 2.5 | 2 | 2.5* | 3.5** |
| Regular Corn Flour | — | 4 | 3.5 | 3 | 4 | 4.5 |

*Pasta had a slight off-taste and a firm, gel-like bite.
**Pasta had an off-taste and a firm, gritty texture.

It was noted that the pasta samples which contained high amylose corn flour or starch had a more acceptable initial appearance upon removal from the can than that of the control sample or those prepared with regular corn flour. The high amylose samples did not hold the shape of the can, but maintained a looser, more appetizing body structure.

The results indicate that high amylose flour and starch significantly improve the texture of retorted pasta, especially at substitution levels of about 30%. At substitution levels above about 40%, compromising tastes and textures (though firmer than the control) resulted.

It was found that although high amylose corn starch provided pasta products with lower boiling water cooking times and tolerances as compared with regular corn flour as shown in Example 1; in retort systems, the high amylose starch performed significantly better than the corn flour at all substitution levels.

EXAMPLE 3

This example illustrates the effect of high amylose corn flour on the texture of retorted elbow macaroni.

Elbow macaronis were prepared employing a 50:50 mixture of durum wheat and semolina substituted with either 5% dried egg or 19% high amylose corn flour (containing 70% amylose). Samples were also prepared employing durum wheat substituted with 25 or 35% of the high amylose flour. The dry ingredients were mixed with varying amounts of warm water having a temperature of 43° C. (110° F.) under pressure in order to prepare dough crumbs of similar consistency. The dough crumbs were fed through a single screw extruder, passed through a die in order to form a tubular shape and then cut by a rotating knife blade to a length of about 1 inch. Cold water was circulated about the extrusion cylinder in order to keep the pasta dough temperature down to about 43°-49° C. (110°-120° F.). The elbows were dried to a moisture of 10-12%.

It was noted that as the level of the high amylose flour was increased, larger amounts of water were required to form dough crumbs of similar consistency. The dried elbow products containing high amylose flour also had a more golden appearance.

Portions of the elbow macaroni samples were retorted in a spaghetti sauce as described above. The 5% egg sample and that prepared with 19% high amylose flour had comparable acceptable textures after retorting. The samples containing 25 and 35% high amylose flour, however, were noticeably firmer.

EXAMPLE 4

This example illustrates the effect of high amylose flour in corn tortillas used in the preparation of retorted enchiladas.

Tortillas were prepared employing the following formulation:

| TORTILLA RECIPE | |
|---|---|
| INGREDIENT | % |
| Masa[1] | 49.87 |
| Guar Gum | 0.13 |
| Water | 50.00 |

[1]Masa Harina (trademark) obtained from Quaker Oats.

Masa was substituted with 0 to 40% high amylose corn flour (containing 70% amylose) in the tortilla formulation.

Tortilla dough was prepared by thoroughly dry blending all the dry ingredients for two minutes in a Hobart mixer then slowly adding warm water having a temperature of 49°-54° C. (120°-130° F.) while continuing to mix. The dough was repeatedly passed through a double roller apparatus until a standard thickness and texture was achieved whereupon it was then cut into sheets. Discs measuring 5 inches in diameter and weighing 32±2 grams were cut.

In order to prepare the enchiladas, 20 grams of filling comprising 2 pounds of cooked ground beef and 600 ml. of enchilada sauce were placed in the center of each dough disc. The enchiladas were rolled and then individually wrapped in wet parchment paper, pressing the edges closed. Four enchiladas were placed in a can measuring 6.7 cm. in diameter and 10.0 cm. high. The cans were filled with extra sauce (pH=4.8), sealed and then still retorted to a center can temperature of 127° C. (260° F.). It took 68 minutes to reach such a temperature and then an additional 22 minutes of cooling before the cans, having a center can temperature of 93° C. (200° F.), could be removed.

In order to evaluate the enchiladas, the contents of each can were reheated over medium heat (low simmer) for 15 minutes with turning in order to heat evenly. The parchment paper was removed prior to serving. The samples were evaluated by a 13 member panel for texture using a rating scale of 1 to 10 with 1 being a very soft texture and 10 being a very firm texture.

The machineability of the tortilla doughs as well as the texture of the retorted enchillada products are described in Table III.

TABLE III

| Sample | Substitution Level % | Tortilla Dough Machineability | Retorted Enchillada Texture |
|---|---|---|---|
| Masa | 0 | workable | 4.4 |
| Masa/HACF[1] | 10 | workable | 5.2 |
| Masa/HACF | 20 | workable | 5.8 |
| Masa/HACF | 30 | tore while filling | — |
| Masa/HACF | 40 | tore while filling | — |

[1]HACF is high amylose corn flour which contains 70% amylose.

The tortilla doughs prepared with 30 and 40% substitution levels of high amylose corn flour were too weak to roll and remain intact without tearing even prior to retorting. The retorted masa control enchiladas broke upon reheating prior to removing the parchment coverings. The enchiladas which contained 10% high amylose corn flour remained intact during reheating, but tore when the parchments were removed. The enchiladas which contained 20% high amylose corn flour remained intact even after the parchments were removed. It can be seen that these enchiladas also had the firmest texture rating compared to the control.

EXAMPLE 5

This example compares retorted enchiladas prepared with tortillas which contain high amylose corn starch and high amylose corn flour.

Tortillas were prepared as described above containing 20% high amylose corn starch or flour (70% amylose) subsitution in the dough formulation. Enchiladas were prepared, retorted and then evaluated for texture. The masa control received a texture rating of 4.4 again. The enchilada containing high amylose flour was rated 5.3 and the enchilada containing high amylose starch was rated 6.7.

We claim:

1. An improved retorted foodstuff selected from the group consisting of pasta and tortillas, wherein the improvement comprises an effective amount of a high amylose starch having an amylose content of at least 50% amylose, the amount being effective to improve the cooking tolerance and firmness of the foodstuff.

2. The retorted foodstuff of claim 1, wherein the high amylose starch is present in an amount of about 10 to 40%, based on the total farinaceous content of the paste composition.

3. The retorted foodstuff of claim 2, wherein the high amylose starch is present in an amount of about 15 to 35%.

4. The retorted foodstuff of claim 1, wherein the pasta is selected from the group consisting of spaghetti, macaroni, and noodles.

5. The retorted foodstuff of claim 1, wherein the high amylose starch is high amylose flour.

6. The retorted foodstuff of claim 1, wherein the high amylose starch contains at least 70% amylose.

7. The product of claim 1, wherein the retorted foodstuff is tortillas.

8. A process for retorting a farinaceous-based paste composition selected from the group consisting of pasta and tortillas comprising the steps of replacing a portion of the farinaceous content of the composition with high amylose starch having an amylose content of at least 50% and retorting the composition, the replacement amount of the high amylose starch being sufficient to improve the cooking tolerance and firmness of the retorted composition.

9. The process of claim 8, wherein the high amylose starch is present in an amount of about 10 to 40%, based on the total farinaceous content of the paste composition.

10. The process of claim 9, wherein the high amylose starch is present in an amount of about 15 to 35%.

11. The process of claim 8, wherein the high amylose starch is high amylose flour.

12. The process of claim 8, wherein the high amylose starch contains at least 70% amylose.

13. The process of claim 8, wherein the paste composition is pasta.

14. The process of claim 13, wherein the paste composition is tortillas.

15. The process of claim 13, wherein the pasta is selected from the group consisting of spaghetti, macaroni, and noodles.

* * * * *